United States Patent
Edlund et al.

(10) Patent No.: US 11,496,959 B2
(45) Date of Patent: Nov. 8, 2022

(54) ESTABLISHING AND CONTROLLING CONNECTION OF USER EQUIPMENT TO A HETEROGENEOUS NETWORK

(71) Applicant: HEWLETT PACKARD ENTERPRISE DEVELOPMENT LP, Houston, TX (US)

(72) Inventors: Jeffrey Edlund, Pleasant Hill, MO (US); Kenneth Gott, Houston, TX (US); Leonid I. Popokh, Plano, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 768 days.

(21) Appl. No.: 16/263,073

(22) Filed: Jan. 31, 2019

(65) Prior Publication Data
US 2020/0252866 A1    Aug. 6, 2020

(51) Int. Cl.
*H04W 48/20* (2009.01)
*H04W 48/16* (2009.01)
*H04B 17/336* (2015.01)
*H04W 24/08* (2009.01)
*H04W 4/80* (2018.01)
*H04W 76/10* (2018.01)

(52) U.S. Cl.
CPC .......... *H04W 48/20* (2013.01); *H04B 17/336* (2015.01); *H04W 4/80* (2018.02); *H04W 24/08* (2013.01); *H04W 48/16* (2013.01); *H04W 76/10* (2018.02)

(58) Field of Classification Search
CPC combination set(s) only.
See application file for complete search history.

(56) References Cited

U.S. PATENT DOCUMENTS 9,814,021 B2    11/2017  Himayat et al.
2010/0039999 A1*  2/2010  Barbaresi .............. H04W 28/16
                                                        370/329

(Continued)

OTHER PUBLICATIONS

El Helou, M. et al., "A Network-Assisted Approach for RAT Selection in Heterogeneous Cellular Networks," Jul. 2015, pp. 1-13, https://www.researchgate.net/publication/274702857_A_Network-assisted_Approach_for_RAT_Selection_in_Heterogeneous_Cellular_Networks.

(Continued)

*Primary Examiner* — Daniel Lai
(74) *Attorney, Agent, or Firm* — Nolte Lackenbach Siegel

(57) ABSTRACT

A method for establishing and controlling a connection of a user equipment (UE) to a radio access network (RAN) included in a heterogeneous wireless network (HWN), including: selecting, via the UE, a RAN from a plurality of heterogeneous RANs detected by the UE based at least in part on a first set of parameters; establishing connection of the UE to the selected RAN; and determining, via a heterogeneous management controller, whether to persist connection of the UE to the selected RAN. Determining whether to persist connection of the UE to the selected RAN includes monitoring a plurality of attributes associated with at least one of the UE, the selected RAN, and the connection between the UE and the selected RAN; and evaluating the plurality of attributes based on a second set of parameters, the second set of parameters being different from the first set of parameters.

17 Claims, 8 Drawing Sheets

(56) References Cited

U.S. PATENT DOCUMENTS

| | | | |
|---|---|---|---|
| 2013/0244654 A1* | 9/2013 | Carmon ............... | H04W 36/32 455/436 |
| 2014/0194117 A1* | 7/2014 | Jeong ............... | H04W 52/0254 455/434 |
| 2014/0256335 A1* | 9/2014 | Kobayashi ............ | H04W 16/22 455/450 |
| 2015/0173045 A1 | 6/2015 | Lee et al. | |

OTHER PUBLICATIONS

Falowo, O. E. et al, "Predictive RAT-Selection Algorithm for Enhancing QoS in Heterogeneous Wireless Networks," Nov. 2014, pp. 1-6, https://ieeexplore.ieee.org/stamp/stamp.jsp?tp=&arnumber=7041837.

Perez, J. S. et al., "Machine Learning Aided Cognitive RAT Selection for 5G Heterogeneous Networks," Jun. 2017, pp. 1-5, https://ieeexplore.ieee.org/stamp/stamp.jsp?tp=&arnumber=8277675.

Porjazoski, M. et al., "Radio Access Technology Selection Algorithm for Heterogeneous Wireless Networks Based on Service Type, User Mobility and Network Load," Oct. 2011, pp. 475-478, https://ieeexplore.ieee.org/stamp/stamp.jsp?tp=&arnumber=6143247.

* cited by examiner

ESTABLISHING AND CONTROLLING CONNECTION OF USER EQUIPMENT TO A HETEROGENEOUS NETWORK

BACKGROUND

Wireless devices (e.g., smart phones, tablets, and laptops) are increasingly used to send and receive data. Such data may be transmitted and received over a wireless network, which may be a homogeneous network or a heterogeneous network. Homogeneous networks generally include a transmission station, or macro node, providing wireless coverage to wireless devices within a defined geographic region (i.e., cell). A heterogeneous network (HetNet) may include a layer of high-power macro nodes overlaid with layers of lower power nodes (e.g., micro nodes, pico nodes, femto nodes, home macro enhanced nodes (eNBs), and relay stations) that may be deployed within the coverage area of the macro nodes. The macro nodes may be utilized for basic coverage, and the lower power nodes may be used to fill gaps in the coverage area, improve coverage in boundaries between macro nodes' coverage areas, and improve coverage inside indoor structures that may impede the signal transmission of the macro nodes.

HetNets, and in particular, heterogeneous wireless networks (HWNs), include multiple radio access networks (RANs) implementing respective radio access technologies (RATs) coexisting in the same geographical location. Example RATs may include BLUETOOTHe, Wi-Fi®, 3G, 4G or LTE, and 5G. Many wireless devices are multimode terminal (MTs) and thus may connect to any available RAN and may roam from one RAN to another in the HWN. Accordingly, in the event one particular RAN within the HWN fails, the connection of the wireless device may be maintained by falling back to another RAN in the HWN. Load balancing may also be carried out across the multiple RANs in an HWN to distribute loads across the multiple RANs.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
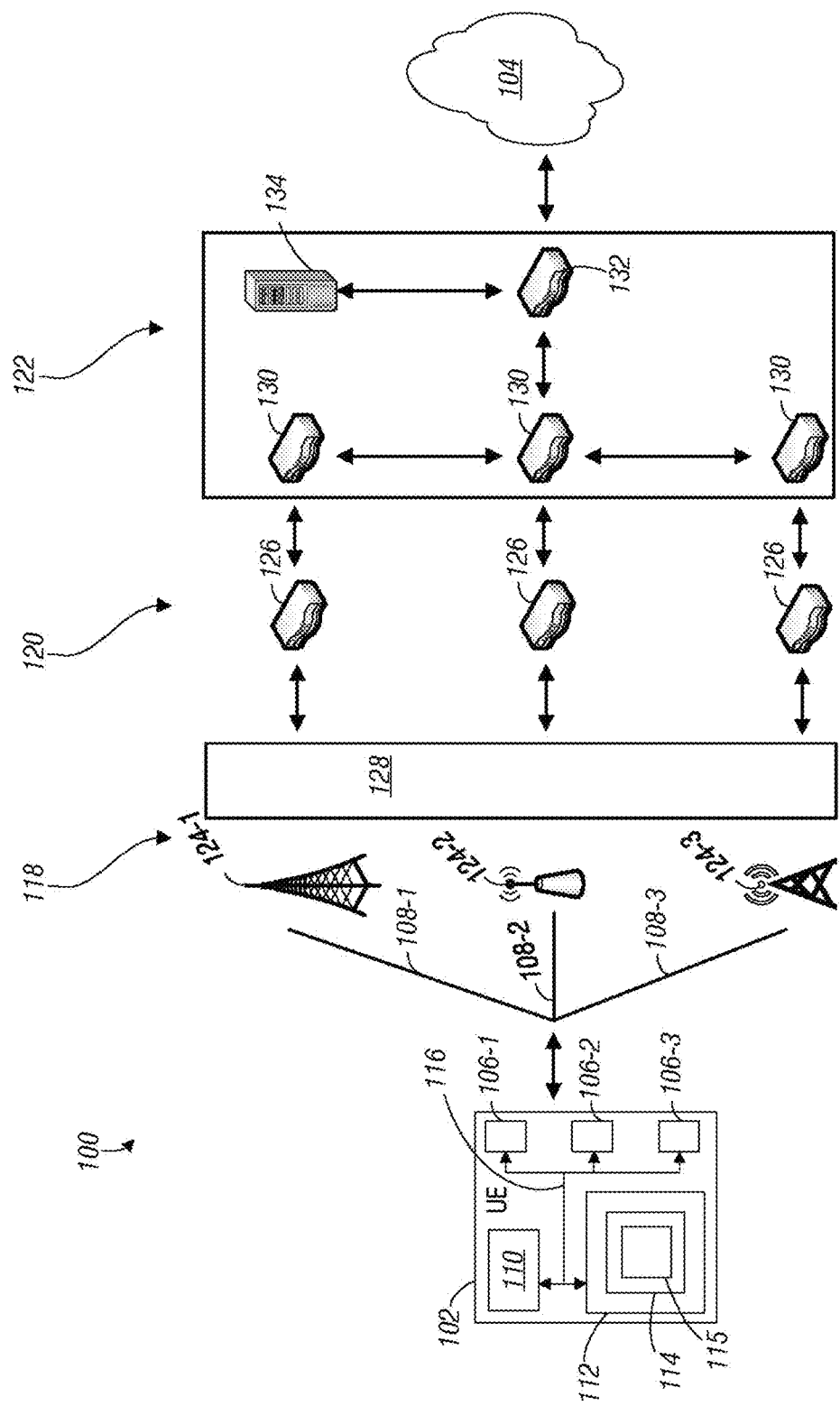
FIG. 1 is a schematic of an HWN to communicatively couple one or more user equipment to a network, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the articles "a" and "an" are intended to have their ordinary meaning in the patent arts, namely "one or more." Herein, the term "about" when applied to a value generally means within the tolerance range of the equipment used to produce the value, or in some examples, means plus or minus 10% unless otherwise expressly specified. Moreover, examples herein are intended to be illustrative only and are presented for discussion purposes and not by way of limitation.

As provided above, HetNets, and in particular, heterogeneous wireless networks (HWNs), include multiple radio access networks (RANs) implementing respective radio access technologies (RATs) coexisting in the same geographical location. Example RATs may include BLUETOOTHe, Wi-Fi®, 3G, 4G or LTE, and 5G. Many wireless devices are multimode terminal (MTs) and thus may connect to any available RAN detected by the wireless device.

The HWNs may further connect the UEs to another network, such as the Internet. To that end, the HWNs include an access network including the multiple RANs in communication with the UEs, an edge network in communication with the access network, and a core network in communication with the edge network and the Internet. Thus, a session (e.g., a voice call, a video transmission, data transmission, or a combination thereof) may be carried out between a UE and the Internet via the HWN.

In some instances, a centralized controller located in the core network may determine which RAN a UE may connect to when initiating a session. Accordingly, a content service provider (CSP) operating the core network may determine the RAN the wireless device connects to based on optimization of the network. However, to optimize the network, the centralized controller sends and receives messages from the UE. Thus, latency is introduced, which may lead to reliability issues depending on the movement of the UE.

In other instances, a fully distributed controller across the UEs may be utilized to determine which RAN a UE may connect to during initiation of a session. Fully distributing control across the UEs decreases centralized message passing. However, such distributed control introduces complexities as the full distribution cannot address all the through-put types and service classes that are desirable to implement.

Accordingly, examples of the present disclosure are directed to systems and methods for establishing and controlling a connection of UE to an HWN utilizing a hybrid of the UE-based and core-based network approach to accomplish more sophisticated network selection with less overhead being place either on the UE or a centralized HetNet controller in the core network. In one or more examples, a heterogeneous management controller, included in an edge network of the HWN, and a UE may collaborate to establish and control a connection of the UE to a RAN of the HWN. Controlling a connection of the UE to the RAN may include preventing oscillation or hopping of the UE from the RAN unless conditions of the UE on the RAN become unacceptable for delivering a user experience within quality of service (QoS)/quality of experience (QoE) limits.

More particularly, in one example of the present disclosure, a method is provided for establishing and controlling a connection of a UE to a RAN included in an HWN. The method may include selecting, via the UE, a RAN from a plurality of heterogeneous RANs detected by the UE based at least in part on a first set of parameters. The method may also include establishing connection of the UE to the selected RAN, and determining, via a heterogeneous management controller, whether to persist connection of the UE to the selected RAN. Determining whether to persist connection of the UE to the selected RAN may include: monitoring a plurality of attributes associated with at least one of the UE, the selected RAN, and the connection between the UE and the selected RAN; and evaluating the plurality of attributes based on a second set of parameters, the second set of parameters being different from the first set of parameters.

In another example of the present disclosure, an HWN is provided to communicatively couple a UE to a packet data network (PDN). The HWN may include an access network, an edge network, and a core network. The access network may include a plurality of heterogeneous RANs. The edge network may communicatively couple the access network and the core network and may include a heterogeneous management controller. The heterogeneous management controller may include one or more processors to communicate with the plurality of heterogeneous radio access networks (RANs), and a computer-readable storage medium. The computer-readable storage medium may be encoded with instructions that, when executed by the one or more processors cause the one or more processors to: determine whether to persist connection of the UE to a RAN of the plurality of heterogeneous RANs, the RAN connected to the UE based at least in part on a first set of parameters. Determining whether to persist connection of the UE to the selected RAN includes: monitoring a plurality of attributes associated with at least one of the UE, the selected RAN, and the connection between the UE and the selected RAN; and evaluating the plurality of attributes based on a second set of parameters, the second set of parameters being different from the first set of parameters.

In another example of the present disclosure, a non-transitory computer-readable medium is provided and includes computer executable instructions stored thereon that when executed by a processor, cause the processor to: determine whether to persist connection of the UE to a RAN of a plurality of heterogeneous RANs, the RAN connected to the UE based at least in part on a first set of parameters. Determining whether to persist connection of the UE to the selected RAN includes: monitoring a plurality of attributes associated with at least one of the UE, the selected RAN, and the connection between the UE and the selected RAN; and evaluating the plurality of attributes based on a second set of parameters, the second set of parameters being different from the first set of parameters.

Turning now to the drawings, FIG. 1 is a schematic of an HWN 100 to communicatively couple one or more user end devices or user equipment (UE) 102 (one shown) to a network, such as a packet data network (PDN) 104, according to one or more examples of the disclosure. The PDN 104 may be, for example, the Internet, an intra-net, or another similar network. Example UEs 102 may include, but are not limited to, mobile devices, such as smart phones, tablets, laptops, and internet of things (IoT) devices. Each UE 102 may be a multimode terminal (MT) having a plurality of radio interfaces 106-1 through 106-3 (also referred to collectively as radio interfaces 106 or individually and generally as a radio interface 106) and thus may be capable of establishing a connection with a plurality of RANs 108-1 through 108-3 (also referred to collectively as RANs 108 or individually and generally as a RAN 108) included in the computing system 100, as will be discussed in greater detail below.

In addition to the radio interfaces 106, the UE 102 may include one or more processors 110 (one shown) and memory 112 including a non-transitory computer-readable medium 114. The radio interfaces 106 may be communicatively coupled to the RANs 108 and the processor(s) 110. The non-transitory computer-readable medium 114 may be communicatively coupled to the processor(s) 110 and the radio interfaces 106 via a bus system 116 for performing at least in part the methods disclosed herein. The non-transitory computer-readable medium 114 may store instructions 115 that, when executed by the processor(s) 110, cause the processor(s) 110 to perform any of the operations of the methods 300, 400, 500, 600, 700, and/or 800, shown in FIGS. 3-8, respectively, which are described in greater detail below.

The HWN 100 may include an access network 118 including the plurality of RANs 108, an edge network 120, and a core network 122 communicatively coupled with one another to facilitate data transfer between the UE 102 and the PDN 104. As illustrated in FIG. 1, each of the RANs 108 communicatively resides between the UE 102 and the edge network 120. The plurality of RANs 108 may be heterogeneous in that each RAN 108 may implement a different radio access technology (RAT). Example RATs may include, but are not limited to, Bluetooth, Wi-Fi®, 3G, 4G or LTE, and 5G. For illustrative purposes, the plurality of RANs 108 shown in FIG. 1 include a first RAN 108-1 implementing 5G as the RAT, a second RAN 108-2 implementing Wi-Fi® as the RAT, and a third RAN 108-3 implementing LTE as the RAT. Correspondingly, the illustrated UE 102 is a MT including a plurality of communication interfaces, such as radio interfaces 106, including a 5G radio interface 106-1, a Wi-Fi® radio interface 106-2, and an LTE radio interface 106-3.

Each RAN may include transmission nodes 124-1 through 124-3 (also referred to collectively as transmission nodes 124 or individually and generally as a transmission node 124) to receive and transmit data to and from the UE 102. The transmission nodes 124 may include, but are not limited to, base stations, access points (APs), and evolved universal terrestrial radio access (E-UTRAN or eUTRAN) or UTRAN modules. For illustrative purposes, the transmission nodes 126 shown in FIG. 1 include a first transmission node 124-1 illustrated as a base station, a second transmission node 124-2 illustrated as an AP, and a third transmission node 124-3 illustrated as an eNodeB. One or more of the transmission nodes 124 may include a macro node (not otherwise shown) and a plurality of low power nodes (e.g., micro nodes, pico nodes, and femto nodes) (also not otherwise shown). The macro node may provide a particular coverage area, and the low power nodes may exist within the geographic area (i.e., cell) covered by the macro node and may be utilized to improve capacity in high use areas by allowing the macro node to offload to the low power nodes. The low power nodes may also be utilized to fill coverage holes within the macro nodes' coverage areas and/or to improve signal reception inside a building or like structure.

Each of the RANs 108 may be in communication with the edge network 120. As illustrated in FIG. 1, each of the transmission nodes 124 of the RANs 108 is communicatively coupled to a respective edge gateway 126 in the edge network 120 via a heterogeneous management controller 128. Although illustrated as a separate edge device, in other implementations, the heterogeneous management controller 128 may be distributed among the edge gateways 126 or other edge devices of the edge network 120. In one or more examples, each edge gateway 126 is a service provider gateway. Although not illustrated, in addition to the edge gateways 126, the edge network 120 may include additional edge devices including, but not limited to, switches, routers, routing switches, integrated access devices (IADs) and a variety of multi area network (MAN)/wide area network (WAN) devices.

The edge gateways 126 may be communicatively coupled to the core network 122. As illustrated in FIG. 1, each edge gateway 126 may be communicatively coupled to a respective core gateway 130 of the core network 122. In one or more examples, each core gateway 130 is a serving gateway. Each core gateway 130 may communicate with one another and with another gateway, illustrated as a PDN gateway 132, to couple the core gateways 130 to the PDN 104. Although not illustrated, the core network 120 may include other core devices including, but not limited to, switches, routers, routing switches, and a mobility management device (MME).

In one or more implementations, the core network 120 may be referred to as an evolved packet core and may include a policy and charging rules function (PCRF) node 134 that can be used to determine, in near real time, policy rules in the HWN 100. The PCRF node 134 can access subscriber databases (not shown) and perform other specialized functions, such as charging systems, as will be appreciated by those of skill in the art having the benefit of this disclosure.

Figure 2:
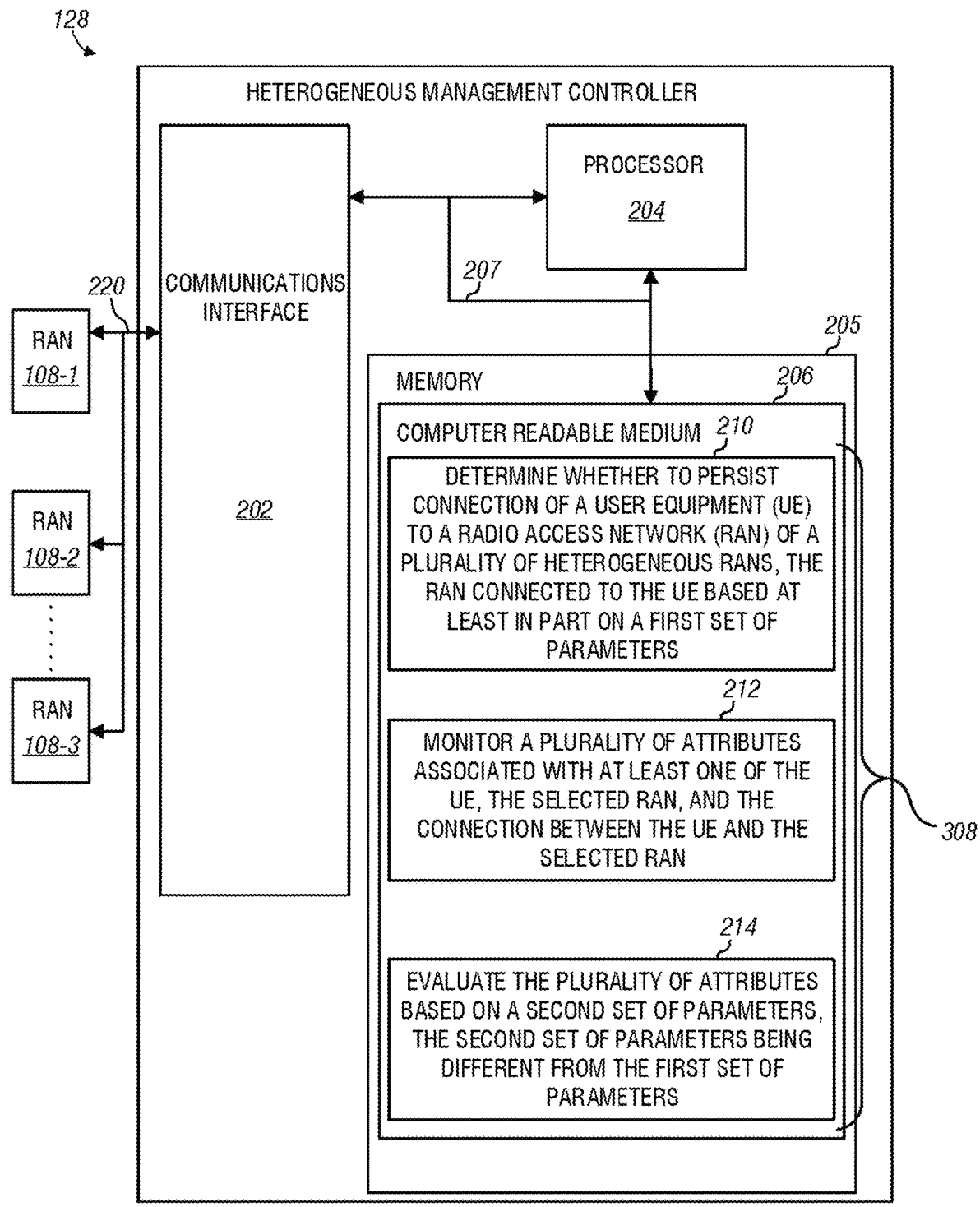
FIG. 2 is a block diagram of a heterogeneous management controller utilized in the HWN of FIG. 1, according to one or more examples of the disclosure.

Referring now to FIG. 2 with continued reference to FIG. 1, FIG. 2 is a block diagram of selected portions of the heterogeneous management controller 128 utilized in the HWN 100 of FIG. 1, according to one or more examples of the disclosure. The heterogeneous management controller 128 may include a communications interface 202, one or more processors (one shown 204), and memory 205 including non-transitory computer-readable medium 206. The communication interface 202 may be communicatively coupled to the RANs 108 of the access network 118, the edge gateways 130 of the edge network 120, and the processor(s) 204. The non-transitory computer-readable medium 206 may be communicatively coupled to the processor(s) 204 and the communications interface 202 via a bus system 207.

As illustrated in FIG. 2, the non-transitory computer-readable medium 206 may store instructions 208 that, when executed by the processor(s) 204, cause the processor(s) 204 to: determine whether to persist connection of a UE to a RAN of a plurality of heterogeneous RANs, the RAN connected to the UE based at least in part on a first set of parameters (block 210); monitor a plurality of attributes associated with at least one of the UE, the selected RAN, and the connection between the UE and the selected RAN (block 212); and evaluate the plurality of attributes based on a second set of parameters, the second set of parameters being different from the first set of parameters (block 214).

Moreover, the instructions 208 may be configured to cause the processor 204 to perform any of the operations of the methods 300, 400, 500, 600, 700, and/or 800, shown in FIGS. 3-8, respectively, which are described in greater detail below. The non-transitory computer-readable storage medium 206 may be integrated in the heterogeneous management controller 128 as shown in FIG. 2, or the non-transitory computer-readable storage medium 206 may be separate from but accessible to the heterogeneous management controller 128. For example, the non-transitory computer-readable storage medium 206 may be the non-transitory computer-readable storage medium 114 included in the memory 112 of the UE 102 or the non-transitory computer-readable storage medium 206 may be distributed across UE 102 and the heterogeneous management controller 128.

In one example, the stored instructions 208 may be part of an installation package that when installed may be executed by the processor(s) 204 to implement any of the operations of the methods 300, 400, 500, 600, 700, and/or 800, shown in FIGS. 3-8, respectively, as provided in more detail below. In this case, the non-transitory computer-readable storage medium 206 may be a portable medium such as an optical disk (e.g., compact disc (CD) or digital video disc (DVD)), or flash drive or a memory maintained by a server from which the installation package can be downloaded or installed. In another example, the stored instructions 208 may be part of an application or applications already installed. Here, the non-transitory computer-readable storage medium 206 may include integrated memory such as hard drive, solid state drive, and the like.

Although the example illustrated in FIG. 2 shows the heterogeneous management controller 128 being implemented with a processor 204 that is to execute instructions 208, it should be understood that the heterogeneous management controller 128 may also be implemented, in whole or in part, using dedicated hardware, such as application-specific integrated circuits (ASICs), complex programmable logic devices (CPLD), and so on. In general, the heterogeneous management controller 128 may include logic that is to: determine whether to persist connection of a UE to a RAN of a plurality of heterogeneous RANs, the RAN connected to the UE based at least in part on a first set of parameters; monitor a plurality of attributes associated with at least one of the UE, the selected RAN, and the connection between the UE and the selected RAN; and evaluate the plurality of attributes based on a second set of parameters, the second set of parameters being different from the first set of parameters, and this logic may include any combination of processors (such as the processor(s) 204), machine readable instructions (such as the instructions 208), and dedicated hardware.

Example methods 300, 400, 500, 600, 700, and 800 utilized for establishing and controlling a connection of a user equipment 102 to a RAN 108 included in an HWN 100, will now be discussed, in the context of FIGS. 1 and 2, and with reference to FIGS. 3-8. The example methods 300, 400, 500, 600, 700 and/or 800 may be performed, for example, at least in part by one or more processing resources associated with the HWN 100, such as the heterogeneous management controller 128. For example, the heterogeneous management controller 128 may execute instructions 208 that causes the heterogeneous management controller 128 to perform some or all of the operations of the methods 300, 400, 50, 600, 700, and/or 800. As another example, the heterogeneous management controller 128 may include dedicated hardware that performs some or all of the operations of the methods 300, 400, 500, 600, 700, and/or 800.

Figure 3:
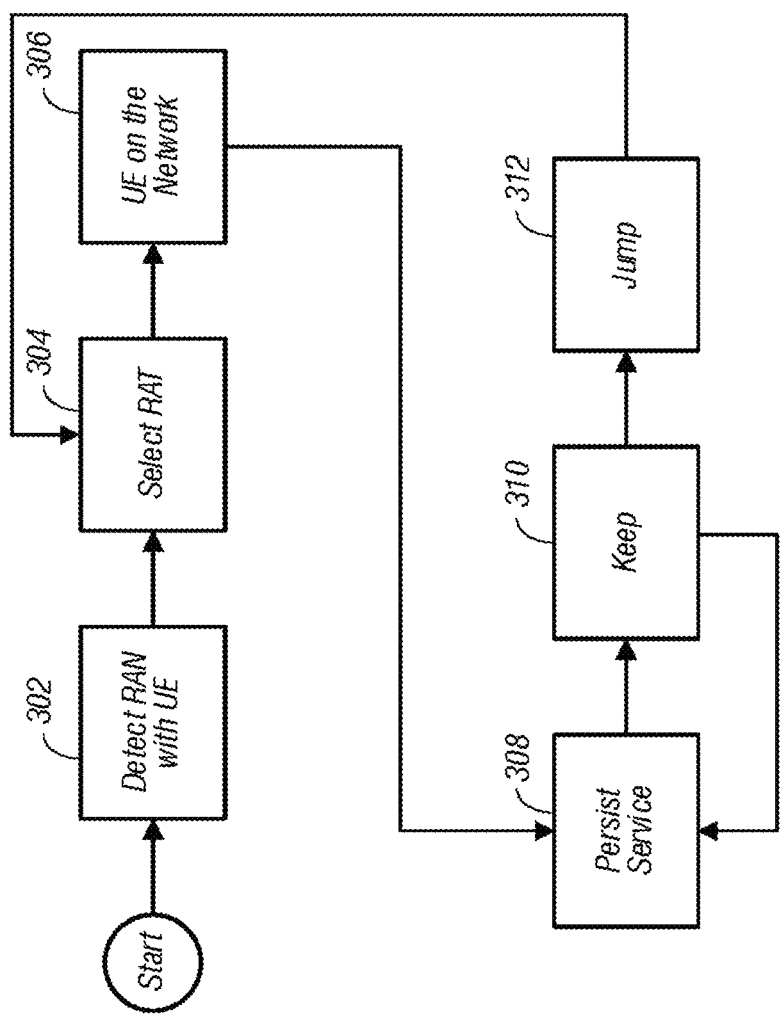
FIG. 3 is a flow chart depicting a method for establishing and controlling a connection of a user equipment to a RAN included in an HWN, according to one or more examples of the disclosure.

Referring now to FIG. 3 with continued reference to FIG. 1 and FIG. 2, FIG. 3 is a flowchart depicting a method 300 for establishing and controlling a connection of a user equipment to a RAN included in an HWN, according to one or more examples of the disclosure. In discussing FIG. 3, reference is made to the UE 102 and HWN 100 of FIG. 1 and the heterogeneous management controller 128 of FIG. 1 and FIG. 2 to provide contextual examples. Implementation, however, is not limited to those examples.

The method 300 may start at block 302 and may include detecting, via the UE 102, a plurality of RANs 108 via respective radio transmissions from the plurality of RANs 108, and a plurality of radio interfaces 106 included in the UE 102. As provided in the UE 102, each radio interface 106 is to communicate with a respective RAN 108 of the plurality of RANs 108. In the event no RANs 108 are detected, the UE 102 continues to monitor the radio interfaces 106 thereof for detectable RANs 108. For energy conservation purposes, the UE 102 may stop detecting for a period of time if no RAN 108 is detected. The period of time may vary and may depend in part on the UE 102 and the state of the power source (e.g., battery, not otherwise shown) providing power to the UE 102.

If one or more RANs 108 are detected, the method 300 proceeds to block 304. At block 304, the method 300 includes selecting, via the UE 102, the initial RAN 108 to connect a session thereto based on a set of RAN selection parameters. For purposes of this disclosure, a session may include a communication to or from the UE 102 including voice, video, data, or any combination thereof over an established connection.

Figure 4:
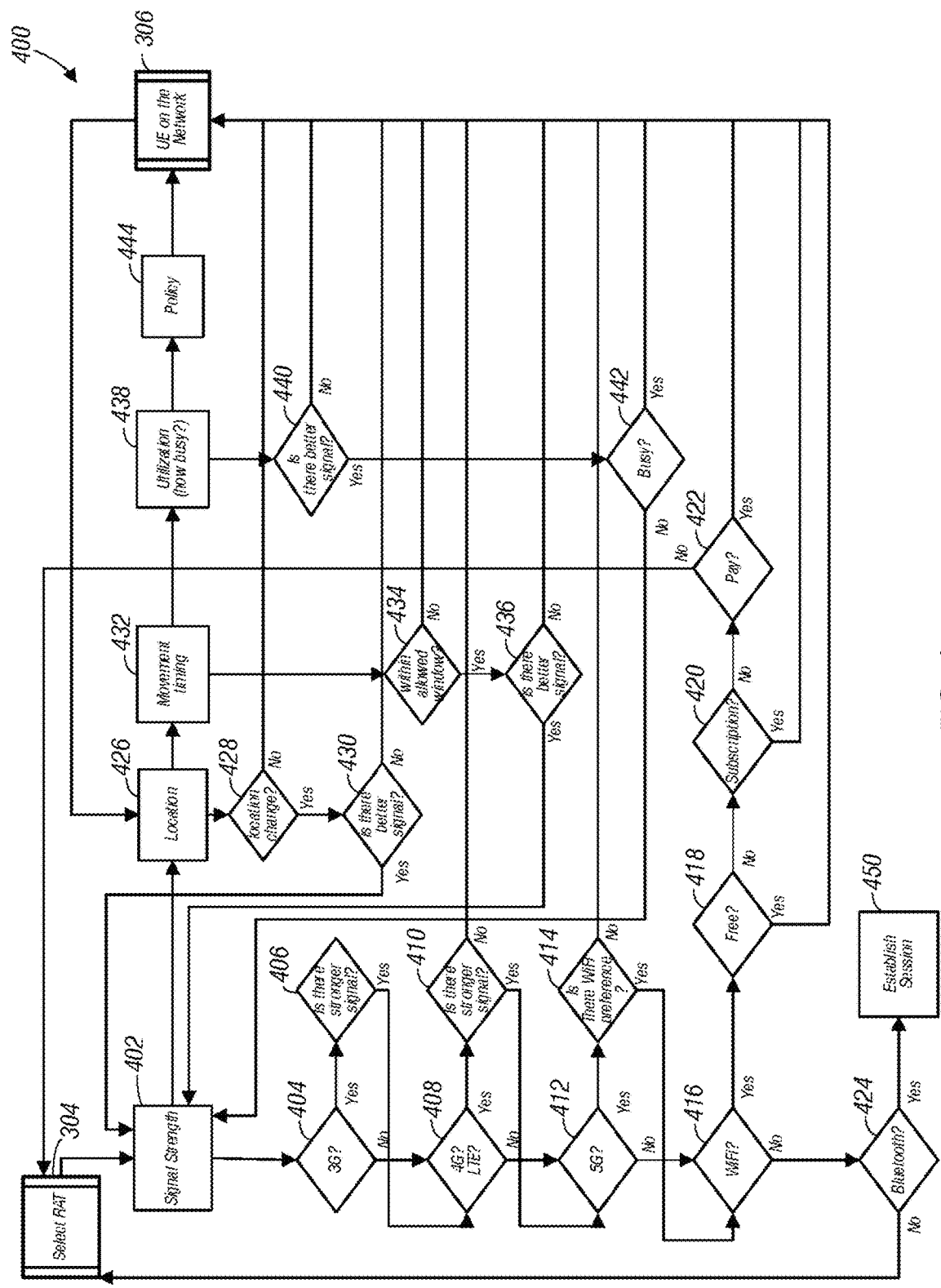
FIG. 4 is a flow chart depicting a method for selecting the initial RAN to connect a session thereto based on a set of RAN selection parameters, according to one or more examples of the disclosure.

Referring now to FIG. 4 with continued reference to FIG. 1 and FIG. 2, FIG. 3 is a flowchart depicting a method 400 for selecting the initial RAN 108 to connect a session thereto based on a set of RAN selection parameters, according to one or more examples of the disclosure. In discussing FIG. 4, reference is made to the UE 102 and HWN 100 of FIG. 1 and the heterogeneous management controller 128 of FIG. 1 and FIG. 2 to provide contextual examples. Implementation, however, is not limited to those examples.

The method 400 implements the operation of block 304 and thus may be based on a set of RAN selection parameters including signal strength of the detected RAN 108, location of the UE 102, movement timing of the UE 102, utilization of the RAN 108, and policies of the RAN 108 and the user of the UE 102. Looking now at block 402, the method 400 may include evaluating the signal strength of the detected RAN(s) 108. In one or more implementations, the signal strength may be evaluated via a signal-to-noise (SNR) ratio of each detected RAN 108. The method 400 may continue to block 404 and may include determining whether the detected RAN 108 is implemented via 3G. If the detected RAN 108 is implemented via 3G, the method 400 continues to block 406 and includes determining whether a stronger RAN signal exists (i.e., a greater SNR). If a stronger RAN signal does not exist, the method 400 continues to block 306.

If a stronger RAN signal exists or the detected RAN 108 is not implemented via 3G, the method continues to block 408.

At block 408, the method 400 may include determining whether the detected RAN 108 is implemented via 4G or LTE. If the detected RAN 108 is implemented via 4G or LTE, the method 400 continues to block 410 and includes determining whether a stronger RAN signal exists (i.e., a greater SNR). If a stronger RAN signal does not exist, the method 400 continues to block 306. If a stronger RAN signal exists or the detected RAN 108 is not implemented via 4G or LTE, the method 400 continues to block 412.

At block 412, the method 400 may include determining whether the detected RAN 108 is implemented via 5G. If the detected RAN 108 is implemented via 5G, the method 400 continues to block 414 and includes determining whether there is a preference for Wi-Fi®. If there is no preference found for Wi-Fi®, the method 400 continues to block 306. If a preference for Wi-Fi® is found or the detected RAN 108 is not implemented via 5G, the method 400 continues to block 416.

At block 416, the method 400 may include determining whether the detected RAN 108 is implemented via Wi-Fi®. If the detected RAN 108 is implemented via Wi-Fi®, the method 400 continues to block 418 and includes determining whether the RAN 108 implemented via Wi-Fi® is free. If a RAN 108 implemented via Wi-Fi® is free, the method 400 continues to block 306. If a RAN 108 implemented via Wi-Fi® is not free, the method 400 continues to block 420. At block 420, the method 400 includes determining whether the RAN 108 implemented via Wi-Fi® is accessible via a subscription. If the RAN 108 implemented via Wi-Fi® is accessible via a subscription, the method 400 continues to block 306. If the RAN 108 implemented via Wi-Fi® is not accessible via a subscription, the method 400 continues to block 422.

At block 422, the method 400 includes determining whether access to the RAN 108 implemented via Wi-Fi® has been paid for. If the access to the RAN 108 implemented via Wi-Fi® has been paid for, the method 400 continues to block 306. If the access to the RAN 108 implemented via Wi-Fi® has been paid for, the method 400 returns to block 402.

Returning to block 416, if the detected RAN 108 is not implemented via Wi-Fi®, the method 400 continues to block 424. At block 424, the method 400 includes determining whether the detected RAN 108 is implemented via BLUETOOTHe. If the detected RAN 108 is implemented via BLUETOOTHe, the method 400 continues to block 450 and includes establishing a session via BLUETOOTHe. If the detected RAN 108 is not implemented via BLUETOOTHe, the method 400 returns to block 304 to start again the selection of a RAN 108 from the detected available RANs 108.

Turning now to the second RAN selection parameter, the location of the UE 102, the method 400 may further include evaluating the location of the UE 102 relative to the HWN 100 (block 426). The location of the UE 102 as one of the RAN selection parameters is used to determine the location and movement of the UE 102, and to calculate the probability of future movement within a given time period to facilitate the determining if an available fixed RAN or a mobile RAN is the most suitable RAN 108 at any given time. The method 400 may continue to block 428 and may include determining whether there was a change in location of the UE 102 relative to the HWN 100. If there was no change in location, the method 400 continues to block 306. If there was a change in location of the UE 102 relative to the HWN 100, the method 400 continues to block 430 and includes determining whether a better signal exists. For purpose of determining if a better signal exists, objective parameters, such as, for example, latency, cost of transmission, and faster transmission speeds, may be evaluated. If it is determined that a better signal exists, the method 400 returns to block 402. If it is determined that a better signal does not exist, the method 400 continues to block 306.

Turning now to the third RAN selection parameter, timing, the method 400 may further include evaluating the movement timing of the UE 102 to manage movement restrictions of the UE 102 (block 432). The movement timing may be used to track potential congestion control considerations associated with RAN selection. Certain time periods of any day as well as time periods associated with special days such as holidays can have a great impact on the utilization of the available bandwidth currently and in the future of a given RAN 108. The method 400 may continue to block 434 and may include determining whether the timing of the movement of the UE 102 was within an allowed window. If the timing of the movement of the UE 102 was not within an allowed window, the method 400 continues to block 306. If the timing of the movement of the UE 102 was within an allowed window, the method 400 continues to block 436 and includes determining whether a better signal exists. For purpose of determining if a better signal exists, objective parameters, such as, for example, latency, cost of transmission, and faster transmission speeds, may be evaluated. If it is determined that a better signal exists, the method 400 returns to block 402. If it is determined that a better signal does not exist, the method 400 continues to block 306.

Turning now to the fourth RAN selection parameter, utilization, the method 400 may further include evaluating the utilization of the detected RANs 108 (block 438). The utilization of each RAN 108 is measured to understand capacity of the RAN 108 vs. SNR. The utilization is used to provide both a real-time view of the existing available bandwidth and latency of a given RAN 108. This information is correlated with historical trending data from the timing parameter to show what network resources are currently available in a given RAN 108 as well as how the utilization of those resources should trend over a period of a session.

The method 400 may continue to block 440 and includes determining whether a better signal exists. For purpose of determining if a better signal exists, objective parameters, such as, for example, latency, cost of transmission, and faster transmission speeds, may be evaluated. If it is determined that a better signal does not exist, the method 400 continues to block 306. and may include determining whether there was change in location of the UE 102 relative to the HWN 100. If it is determined that a better signal exists, the method 400 continues to block 442 and determines whether the detected RAN 108 is busy (i.e., overutilized). If detected RAN 108 is busy, the method 400 continues to block 306. If the detected RAN 108 is not busy, the method returns to block 402.

Turning now to the fifth RAN selection parameter, policy, the method 400 may further include evaluating user or RAN policies to determine if restrictions exist regarding selection of any of the detected RANs 108 (block 444). The policy selection parameter may include a requested or enforced policy, for example, a user-initiated rule that will not allow selection or switching to a RAN 108 that has a charge associated with it; and/or a network enforce policy, such as a content service provider enforced policy that will not allow roaming from one carrier's spectrum to another. If a restriction does not exist regarding selection of the detected RAN 108, the method 400 continues to block 306. If a restriction exists regarding selection of the detected RAN 108, the method 400 returns to block 402.

At block 306, the method 400 includes connecting the UE 102 to the initially selected RAN 108. Accordingly, returning now to FIG. 3, at block 306, the method 300 may resume. After connecting the UE 102 to the initially selected RAN 108 (block 306), the method 300 continues to block 308 and includes determining whether to persist connection of the UE 102 to the initially selected RAN 108.

Figure 5:
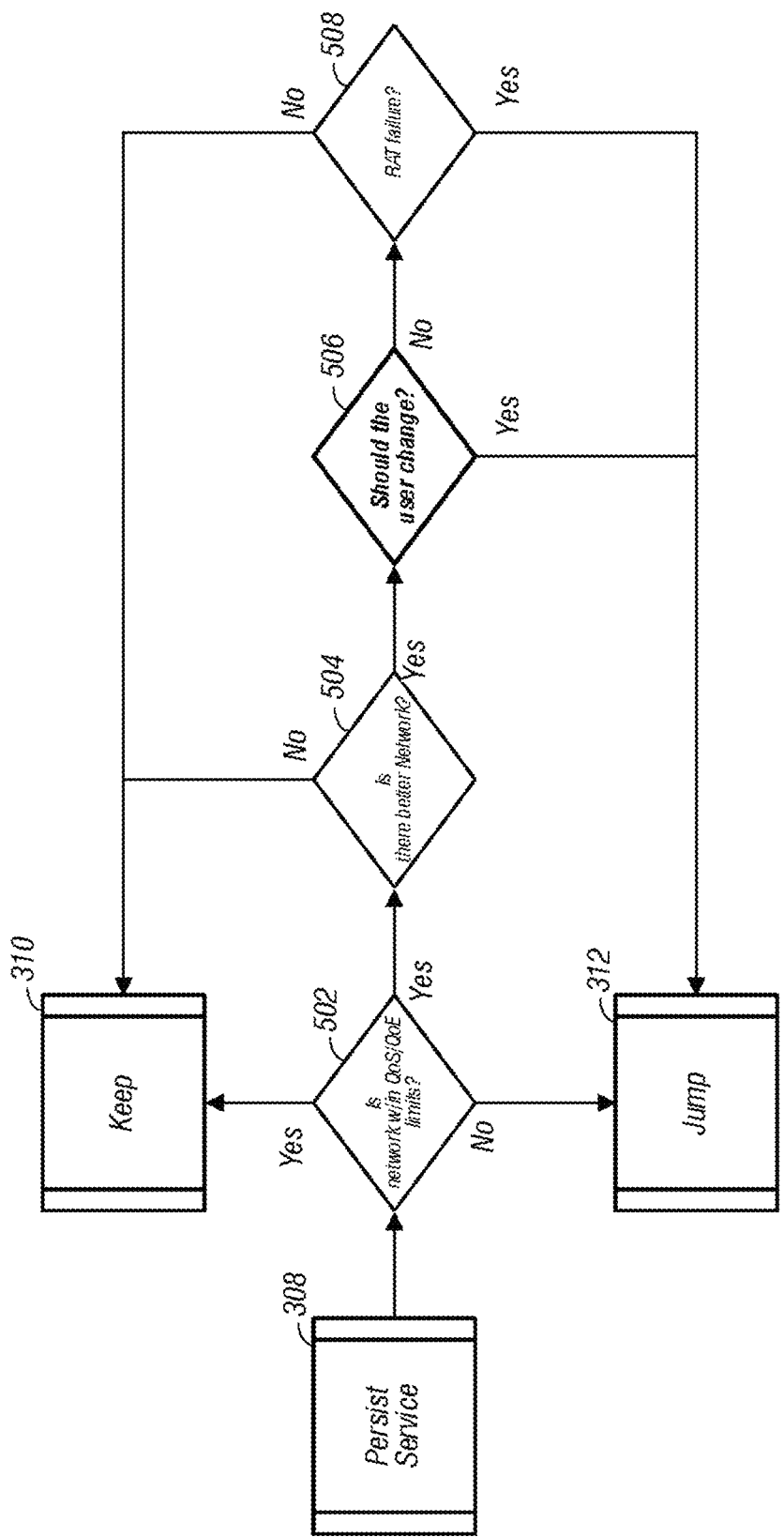
FIG. 5 is a flow chart depicting a method for determining whether to persist connection of the UE to the initially selected RAN, according to one or more examples of the disclosure.

Referring now to FIG. 5 with continued reference to FIG. 1 and FIG. 2, FIG. 5 is a flowchart depicting a method 500 for determining whether to persist connection of the UE 102 to the initially selected RAN 108, according to one or more examples of the disclosure. In discussing FIG. 4, reference is made to the UE 102 and HWN 100 of FIG. 1 and the heterogeneous management controller 128 of FIG. 1 and FIG. 2 to provide contextual examples. Implementation, however, is not limited to those examples.

The method 500 implements the operation of block 306 and thus starting at block 502 may include determining whether the initially selected RAN 108 is within quality of service (QoS)/quality of experience (QoE) limits. If the initially selected RAN 108 is within the QoS/QoE limits, the method 500 continues to both blocks 504 and 310. If the initially selected RAN 108 is not within QoS/QoE limits, the method 500 continues to block 312.

At block 504, the method 500 may include determining whether a better signal exists. For purpose of determining if a better signal exists, objective parameters, such as, for example, latency, cost of transmission, and faster transmission speeds, may be evaluated. If it is determined that a better signal does not exist, the method 500 returns to block 310. If it is determined that a better signal exists, the method 500 continues to block 506 and includes determining whether the initially selected RAN 108 is to be changed.

Figure 6:
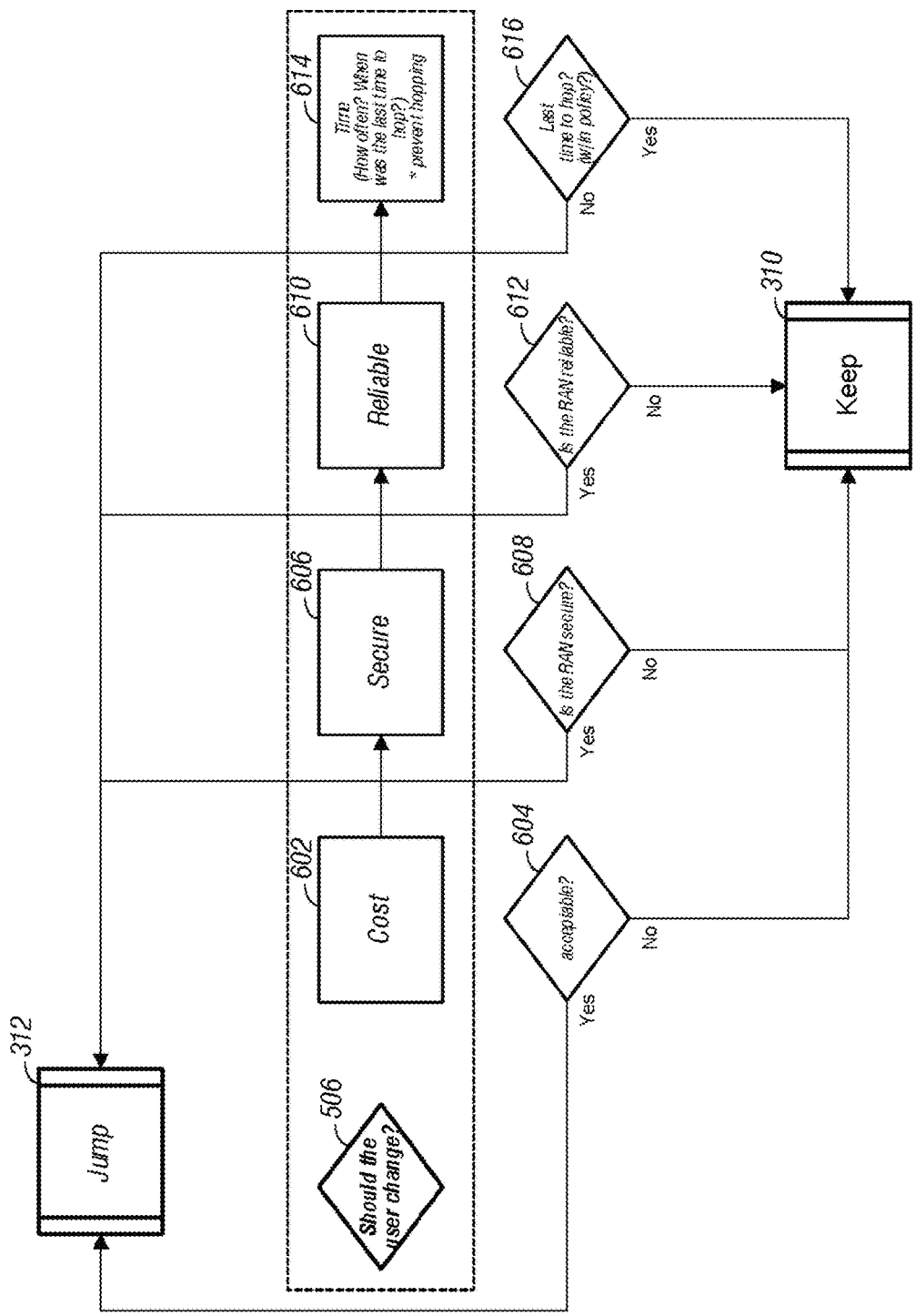
FIG. 6 is a flow chart depicting a method for whether the initially selected RAN is to be changed, according to one or more examples of the disclosure, according to one or more examples of the disclosure.

Referring now to FIG. 6 with continued reference to FIG. 1 and FIG. 2, FIG. 6 is a flowchart depicting a method 600 for determining whether the initially selected RAN 108 is to be changed, according to one or more examples of the disclosure. In discussing FIG. 6, reference is made to the UE 102 and HWN 100 of FIG. 1 and the heterogeneous management controller 128 of FIG. 1 and FIG. 2 to provide contextual examples. Implementation, however, is not limited to those examples.

The method 600 implements the operation of block 506 and thus may be based on a set of service parameters including cost, security, reliability, and timing. At block 602, a first service parameter is cost, and the method 600 includes determining whether the cost benefit to switching is acceptable (block 604). As provided herein, the cost benefit may be tangible (i.e., money) or intangible (e.g., avoidance of a dropped or interrupted call). If the cost benefit to switching is determined to be acceptable, the method 600 continues to block 312. If the cost benefit to switching is determined to not be acceptable, the method 600 continues to block 310.

At block 606, a second service parameter is security and determining whether the initially selected RAN 108 is secure (block 608). If the initially selected RAN 108 is secure, the method 600 continues to block 312. If the initially selected RAN 108 is not secure, the method 600 continues to block 310.

At block 610, a third service parameter is reliability and determining whether the initially selected RAN 108 is reliable (block 612). If the initially selected RAN 108 is reliable, the method 600 continues to block 312. If the initially selected RAN 108 is not reliable, the method 600 continues to block 310.

At block 614, a fourth service parameter is when the initially selected RAN 108 last hopped or oscillated and determining whether the initially selected RAN 108 last hopped or oscillated was within the policy limits (block 616). If the last time the initially selected RAN 108 hopped or oscillated was within the policy limits, the method 600 continues to block 310. If the last time the initially selected RAN 108 hopped or oscillated was not within the policy limits, the method 600 continues to block 312.

Returning now to FIG. 5, the method 500 continues from block 506 to block 508 and includes determining whether there was a failure in the initially selected RAN 108. If there was a failure in the initially selected RAN 108, the method 500 continues to block 312. If there was not a failure in the initially selected RAN 108, the method 500 continues to block 310. Accordingly, returning now to FIG. 3, at block 306, the method 300 may resume. After determining whether to persist connection of the UE 102 to the initially selected RAN 108 (block 308), the method 300 continues to block 310 and includes determining whether to keep the connection of the UE 102 to the initially selected RAN 108.

Figure 7:
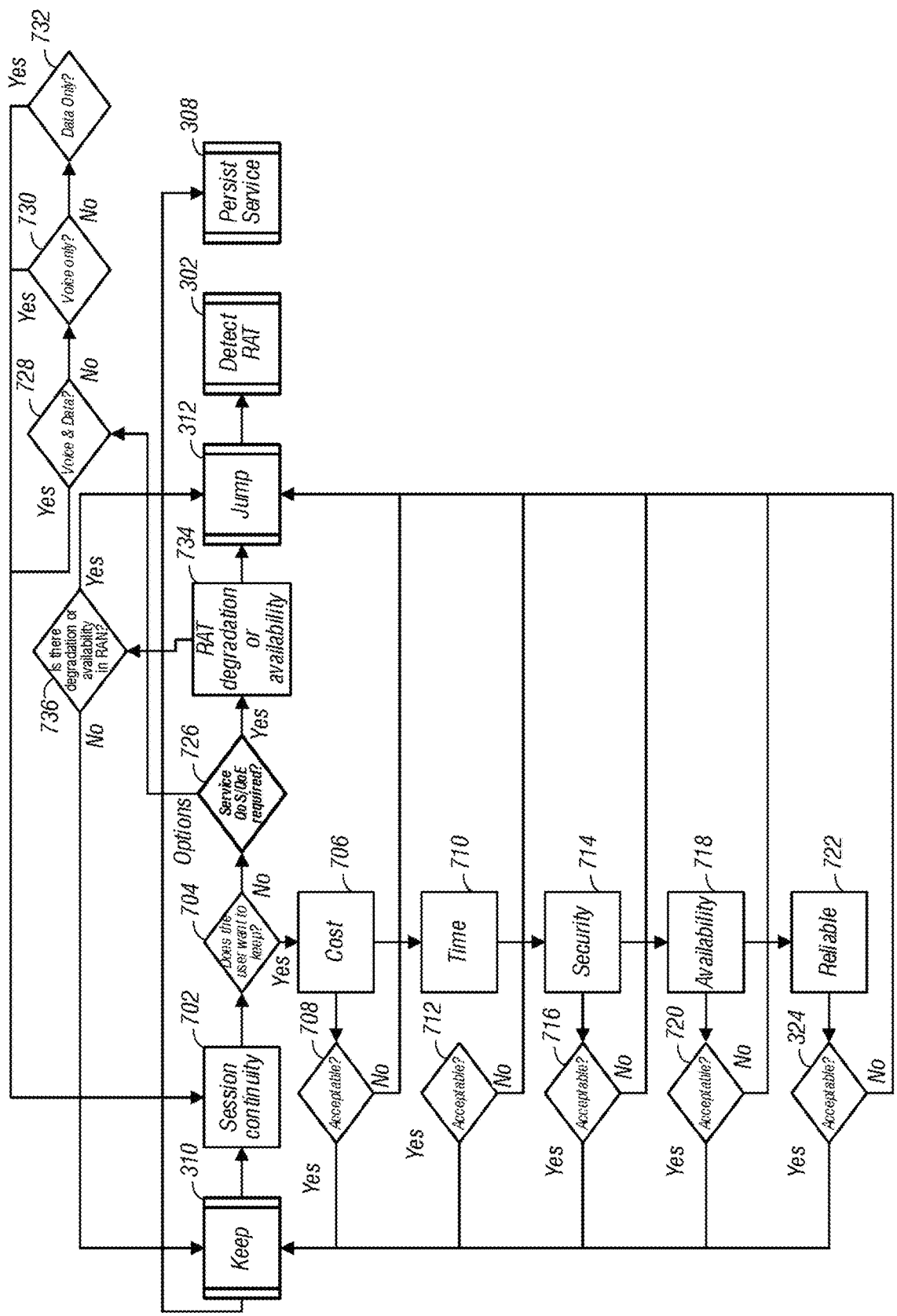
FIG. 7 is a flow chart depicting a method for determining whether to keep the connection of the UE to the initially selected RAN, according to one or more examples of the disclosure.

Turning now to FIG. 7 with continued reference to FIG. 1 and FIG. 2, FIG. 7 is a flowchart depicting a method 700 for determining whether to keep the connection of the UE 102 to the initially selected RAN 108, according to one or more examples of the disclosure. In discussing FIG. 7, reference is made to the UE 102 and HWN 100 of FIG. 1 and the heterogeneous management controller 128 of FIG. 1 and FIG. 2 to provide contextual examples. Implementation, however, is not limited to those examples.

The method 700 implements the operation of block 310 and thus starting at block 702 may include identifying an active session on the initially selected RAN 108. The method may continue to block 704 and may include determining whether to keep the session continuity. If it is determined to keep the session continuity, the method 700 continues to a plurality of continuity parameters for keeping the session continuity. The plurality of continuity parameters may include cost, time, security, availability, and reliability. At block 706, a first continuity parameter is cost and determining whether the cost benefit for keeping the session continuity is acceptable (block 708). As provided above, the cost benefit may be tangible (i.e., money) or intangible (e.g., avoidance of a dropped or interrupted call). If the cost for keeping the session continuity is determined to be acceptable, the method 700 continues to block 310. If the cost for keeping the session continuity is determined to not be acceptable, the method 700 continues to block 312.

At block 710, a second continuity parameter is time and determining whether the time for keeping the session continuity is acceptable (block 712). If the time for keeping the session continuity is determined to be acceptable, the method 700 continues to block 310. If the time for keeping the session continuity is determined to not be acceptable, the method 700 continues to block 312.

At block 714, a third continuity parameter is time and determining whether the security for keeping the session continuity is acceptable (block 716). If the security for keeping the session continuity is determined to be acceptable, the method 700 continues to block 310. If the security for keeping the session continuity is determined to not be acceptable, the method 700 continues to block 312.

At block 718, a fourth continuity parameter is availability and determining whether the availability for keeping the session continuity is acceptable (block 720). If the availability for keeping the session continuity is determined to be acceptable, the method 700 continues to block 310. If the availability for keeping the session continuity is determined to not be acceptable, the method 700 continues to block 312.

At block 722, a fifth continuity parameter is reliability and determining whether the reliability for keeping the session continuity is acceptable (block 724). If the reliability for keeping the session continuity is determined to be acceptable, the method 700 continues to block 310. If the reliability for keeping the session continuity is determined to not be acceptable, the method 700 continues to block 312.

If it is determined to not keep the session continuity, the method 700 continues to a block 726 and includes determining whether QoS/QoE service is mandated. If QoS/QoE service is not mandated, the method continues to block 728 and includes determining whether the session is voice and data. If the session is determined to be voice and data, the method 700 returns to block 702. If the session is not determined to be voice and data, the method 700 continues to block 730 and includes determining whether the session is voice only. If the session is determined to be voice only, the method 700 returns to block 702. If the session is not determined to be voice only, the method 700 continues to block 732 and includes determining whether the session is data only. If the session is determined to be data only, the method 700 returns to block 702.

Returning now to block 726, if QoS/QoE service is mandated, the method continues to block 734 and includes determining whether there is degradation or availability in the initially selected RAN 108 (block 736). If there is no degradation or availability, the method 700 returns to block 310. If there is degradation or availability in the initially selected RAN 108, the method 700 continues to block 312. The method 700 continues from block 310 to block 308. Additionally, the method 700 continues from block 312 to block 302.

Accordingly, returning now to FIG. 3, at block 310, the method 300 may resume. After determining whether to keep the connection of the UE 102 to the initially selected RAN 108 (block 310), the method 300 continues to block 312 and includes determining whether to jump (e.g., disconnect) the connection of the UE 102 to the initially selected RAN 108.

Figure 8:
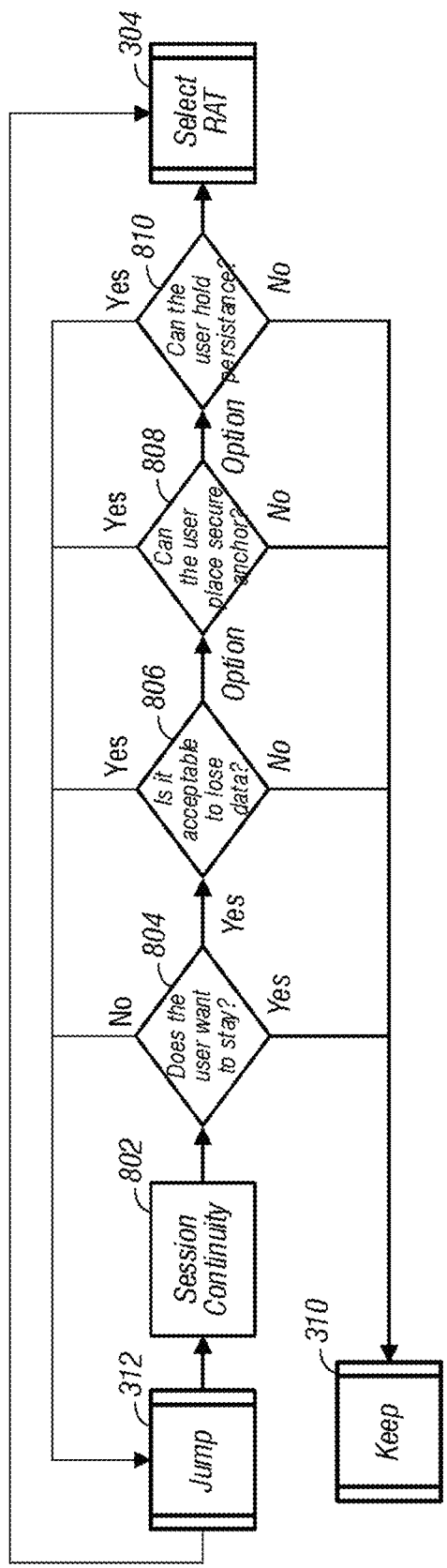
FIG. 8 is a flow chart depicting a method for determining whether to jump (e.g., disconnect) the connection of the UE to the initially selected RAN, according to one or more examples of the disclosure.

Turning now to FIG. 8 with continued reference to FIG. 1 and FIG. 2, FIG. 8 is a flowchart depicting a method 800 for determining whether to jump (e.g., disconnect) the connection of the UE 102 to the initially selected RAN 108, according to one or more examples of the disclosure. In discussing FIG. 8, reference is made to the UE 102 and HWN 100 of FIG. 1 and the heterogeneous management controller 128 of FIG. 1 and FIG. 2 to provide contextual examples. Implementation, however, is not limited to those examples.

The method 800 implements the operation of block 312 and thus starting at block 802 may include identifying an active session continuity of the initially selected RAN 108. The method may continue to block 804 and may include determining whether to keep the connection of the initially selected RAN 108. If it is determined to keep the connection of the initially selected RAN 108, the method 800 continues to blocks 310 and 804. If it is determined to not keep the connection of the initially selected RAN 108, the method 800 returns to block 312.

At block 806, the method 800 includes determining whether it is acceptable to lose data. If it is determined to be acceptable to lose data, the method 800 continues to block 310. If it is determined not to be acceptable to lose data, the method 800 returns to block 312. Optionally, the method 800 may continue to block 808 and include determining whether a secure anchor may be placed. If it is determined that a secure anchor may be placed, the method 800 continues to block 312. If it is determined that a secure anchor may not be placed, the method 800 returns to block 310.

Optionally, the method 800 may continue to block 810 and include determining whether persistence may be held. If it is determined that persistence may be held, the method 800 continues to block 312. If it is determined that persistence may not be held, the method 800 returns to block 310. Returning now to FIG. 3, the method 300 may resume. After determining to jump (e.g., disconnect) the connection of the UE 102 to the initially selected RAN 108 (block 312), the method 300 may return to block 304 and includes selecting, via the UE 102, the initial RAN 108 to connect thereto based on a RAN selection process.

As used herein, a "processor" may include any circuitry that is capable of executing machine-readable instructions, such as central processing units (CPUs), microprocessors, microcontrollers, digital signal processors (DSPs), field-programmable gate arrays (FPGAs), application-specific instruction set processors (ASIPs), etc.

As provided above, examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may include random access memory (RAM), read-only memory (ROM), electrically erasable programmable read-only memory (EEPROM), compact disk read-only memory (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and BLU-RAY® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

Furthermore, examples disclosed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for establishing and controlling a connection of a user equipment (UE) to a radio access network (RAN) included in a heterogeneous wireless network (HWN), comprising:
monitoring a plurality of radio interfaces for respective radio transmissions from a plurality of heterogeneous RANs, the plurality of radio interfaces included in the UE;
interrupting monitoring the plurality of radio interfaces for a predetermined period of time in response to the plurality of heterogeneous RANs not being detected during an interval;
selecting, via the UE, a RAN from the plurality of heterogeneous RANs detected by the UE based at least in part on a first set of parameters;
establishing connection of the UE to the selected RAN; and
determining, via a heterogeneous management controller, whether to persist connection of the UE to the selected RAN, wherein determining whether to persist connection of the UE to the selected RAN includes:
monitoring a plurality of attributes associated with at least one of the UE, the selected RAN, and the connection between the UE and the selected RAN; and
evaluating the plurality of attributes based on a second set of parameters, the second set of parameters being different from the first set of parameters.

2. The method of claim 1, further comprising:
detecting the plurality of heterogeneous RANs via a plurality of radio interfaces included in the UE, each radio interface to communicate with a respective RAN of the plurality of heterogeneous RANs.

3. The method of claim 1, wherein the first set of parameters includes:
signal-to-noise (SNR) measurement of each of the plurality of heterogeneous RANs;
a current location of the UE relative to each of the plurality of heterogeneous RANs;
historical changes in location of the UE relative to the current location of the UE;
utilization measurements of each of the plurality of heterogeneous RANs, the utilization measurements indicative of a capacity of a respective RAN; and
at least one of a user policy and a network policy to restrict selection of one or more RANs of the plurality of heterogeneous RANs.

4. The method of claim 1, further comprising:
in response to the evaluation of the plurality of attributes based on the second set of parameters,
selecting a second RAN from the plurality of heterogeneous RANs based on the first set of parameters; and transferring the connection of the UE from the initially selected RAN to the second RAN.

5. The method of claim 1, wherein the second set of parameters comprises:
costs associated with terminating connection with the initially selected RAN;
security of the connection with the initially selected RAN;
reliability of the connection with the initially selected RAN; and
length of time since the last termination of a connection with a previously selected RAN.

6. The method of claim 1, wherein the HWN includes:
an access network including the plurality of heterogeneous RANs;
an edge network; and
a core network,
wherein the heterogeneous management controller is included in the edge network.

7. The method of claim 1, further comprising:
in response to the evaluation of the plurality of parameters based on the second set of parameters, persisting the connection of the UE to the selected RAN, thereby preventing a termination of the connection between the UE and the selected RAN.

8. The method of claim 1, wherein the plurality of heterogeneous RANs implements radio access technologies (RATs) including at least two of Bluetooth, Wi-Fi®, 3G, 4G, Long Term Evolution (LTE), and 5G.

9. A heterogeneous wireless network (HWN) to communicatively couple a user equipment (UE) to a packet data network (PDN), the HWN comprising:
an access network including a plurality of heterogeneous radio access networks (RANs);
a core network; and
an edge network communicatively coupling the access network and the core network, the edge network comprising a heterogeneous management controller, the heterogeneous management controller including:
one or more processors to communicate with the plurality of heterogeneous RANs; and
a computer-readable storage medium encoded with instructions that, when executed by the one or more processors cause the one or more processors to:
determine whether to persist a connection of the UE to a RAN of the plurality of heterogeneous RANs, the RAN connected to the UE based at least in part on a first set of parameters, wherein the first set of parameters includes:
signal-to-noise (SNR) measurement of each of the plurality of heterogeneous RANs;
a current location of the UE relative to each of the plurality of heterogeneous RANs;
historical changes in location of the UE relative to the current location of the UE;
utilization measurements of each of the plurality of heterogeneous RANs, the utilization measurements indicative of a capacity of a respective RAN; and
at least one of a user policy and a network policy to restrict selection of one or more RANs of the plurality of heterogeneous RANs,
and wherein determining whether to persist connection of the UE to the RAN includes:
monitoring a plurality of attributes associated with at least one of the UE, the selected RAN, and the connection between the UE and the selected RAN; and
evaluating the plurality of attributes based on a second set of parameters, the second set of parameters being different from the first set of parameters.

10. The HWN of claim 9, wherein the second set of parameters comprises:
costs associated with terminating connection with the initially selected RAN;
security of the connection with the initially selected RAN;
reliability of the connection with the initially selected RAN; and
length of time since the last termination of a connection with a previously selected RAN.

11. The HWN of claim 9, wherein the plurality of heterogeneous RANs implements radio access technologies (RATs) including at least two of BLUETOOTH®, Wi-Fi®, 3G, 4G, LTE, and 5G.

12. The HWN of claim 9, wherein the computer-readable storage medium comprising further instructions executable by the one or more processors to:
in response to the evaluation of the plurality of parameters based on the second set of parameters, persist connection of the UE to the selected RAN, thereby preventing a termination of the connection between the UE and the selected RAN.

13. The HWN of claim 9, wherein the edge network further comprises a plurality of gateways, and the heterogeneous management controller is distributed among the plurality of gateways.

14. A non-transitory computer-readable medium comprising computer executable instructions stored thereon that when executed by one or more processors, cause the one or more processors to:
determine whether to persist connection of a user equipment (UE) to a radio access network (RAN) of a plurality of heterogeneous RANs, the RAN connected to the UE based at least in part on a first set of parameters, wherein determining whether to persist connection of the UE to the selected RAN includes:
monitoring a plurality of attributes associated with at least one of the UE, the selected RAN, and the connection between the UE and the RAN; and
evaluating the plurality of attributes based on a second set of parameters, the second set of parameters being different from the first set of parameters, and wherein the second set of parameters comprises:
costs associated with terminating connection with the initially selected RAN;
security of the connection with the initially selected RAN;
reliability of the connection with the initially selected RAN; and
length of time since the last termination of a connection with a previously selected RAN.

15. The non-transitory computer-readable medium of claim 14, wherein the first set of parameters includes:
signal-to-noise (SNR) measurement of each of the plurality of heterogeneous RANs;
a current location of the UE relative to each of the plurality of heterogeneous RANs;
historical changes in location of the UE relative to the current location of the UE;
utilization measurements of each of the plurality of heterogeneous RANs, the utilization measurements indicative of a capacity of a respective RAN; and
at least one of a user policy and a network policy to restrict selection of one or more RANs of the plurality of heterogeneous RANs.

16. The non-transitory computer-readable medium of claim 14, wherein the computer-readable storage medium comprises further instructions executable by the processor to:

in response to the evaluation of the plurality of parameters based on the second set of parameters, persist connection of the UE to the selected RAN, thereby preventing a termination of the connection between the UE and the selected RAN.

17. The non-transitory computer-readable medium of claim 14, wherein the plurality of heterogeneous RANs implements radio access technologies (RATs) including at least two of BLUETOOTH®, Wi-Fi®, 3G, 4G, Long Term Evolution (LTE), and 5G.

\* \* \* \* \*